No. 717,116. Patented Dec. 30, 1902.
H. A. PARK.
BAND SAW SHINGLE MACHINE.
(Application filed Sept. 5, 1901.)
(No Model.) 5 Sheets—Sheet 3.
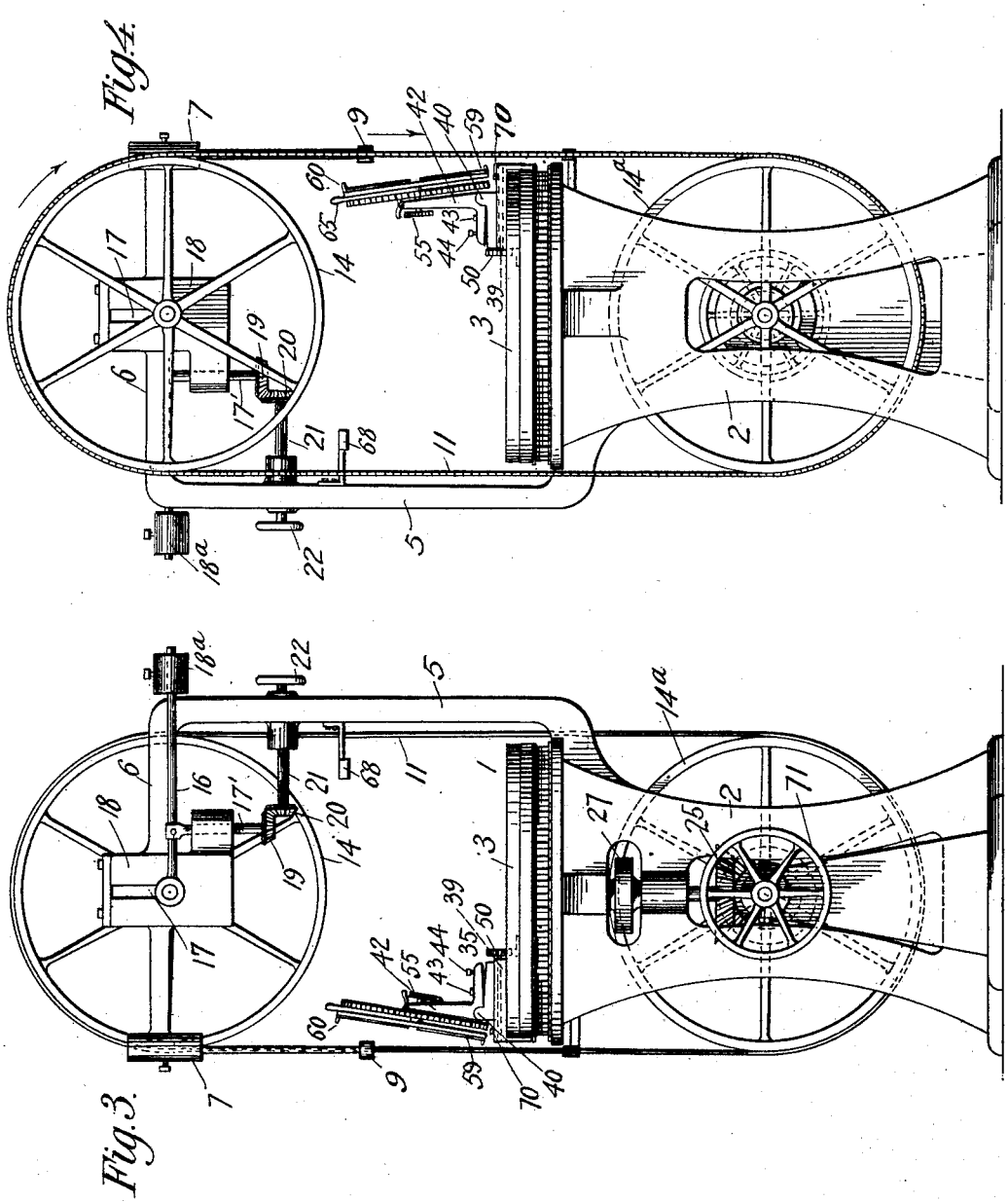
H. A. Park Inventor
Witnesses:

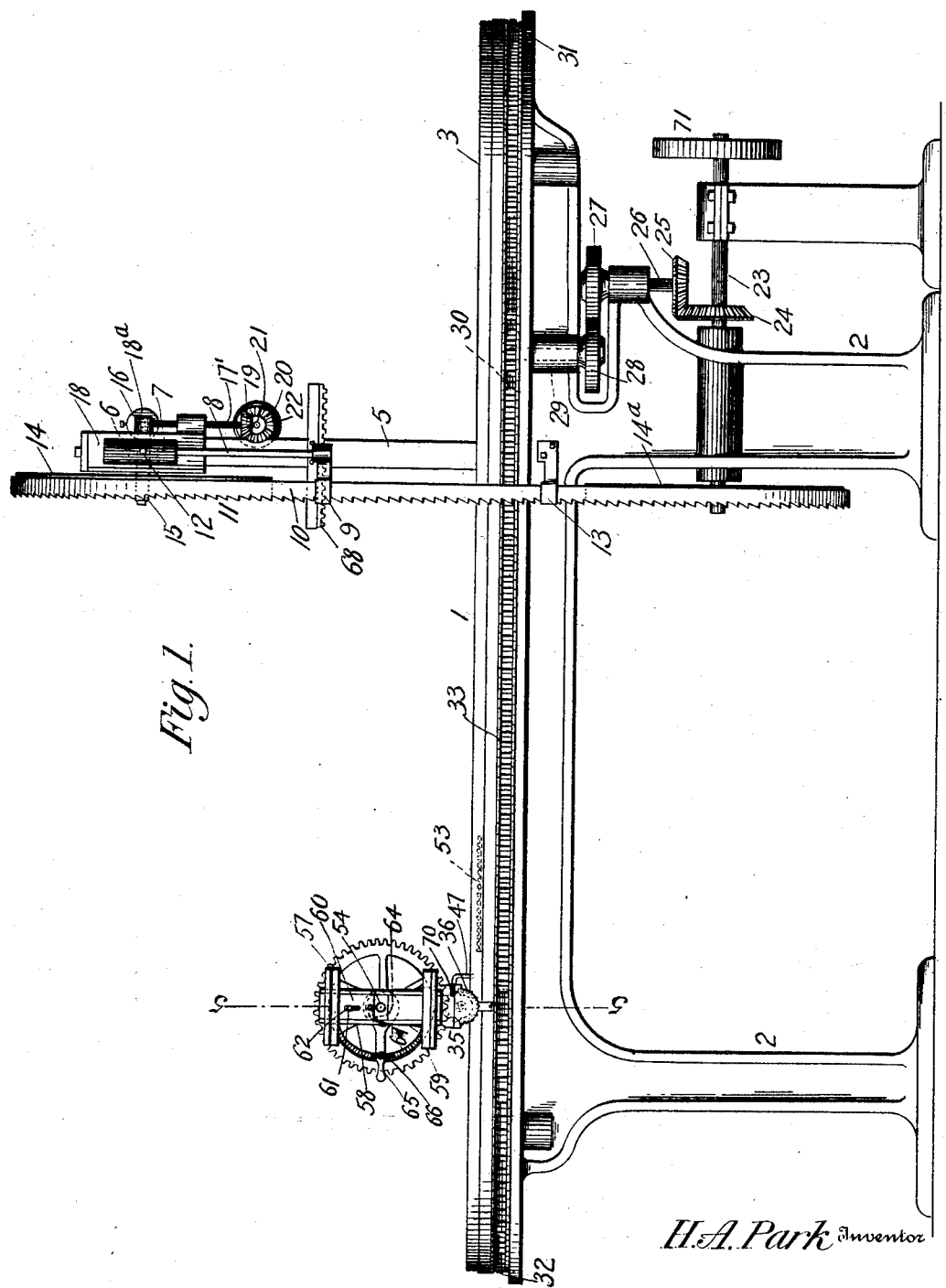

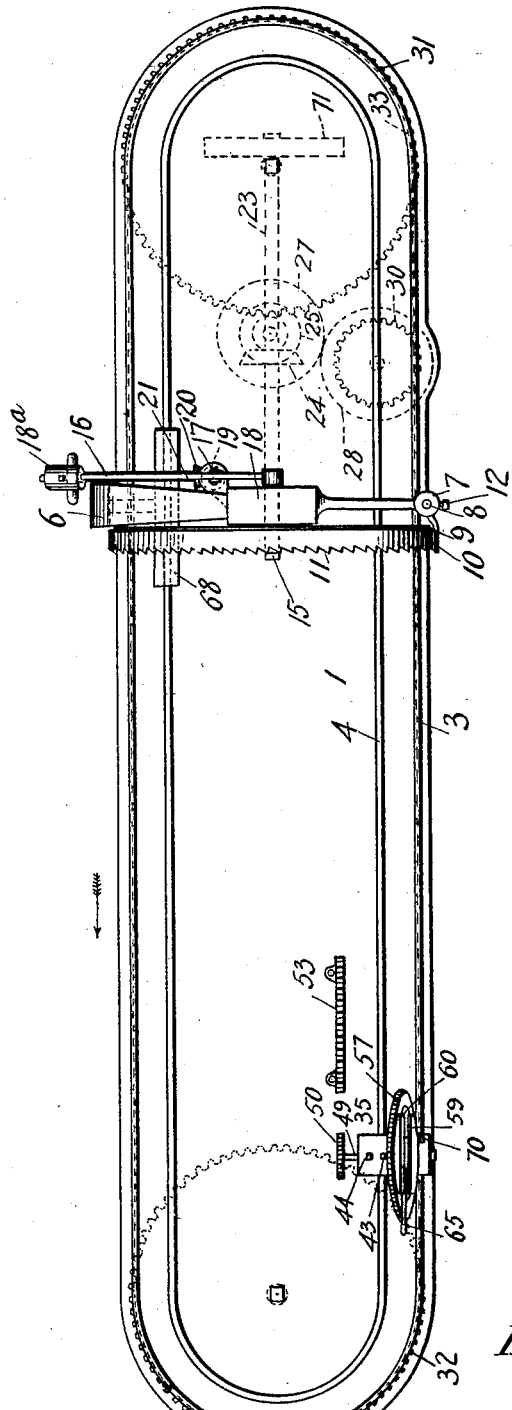

No. 717,116. Patented Dec. 30, 1902.
H. A. PARK.
BAND SAW SHINGLE MACHINE.
(Application filed Sept. 5, 1901.)

(No Model.) 5 Sheets—Sheet 4.

H. A. Park, Inventor

THE NORRIS PETERS CO., PHOTO-LITHO., WASHINGTON, D. C.

No. 717,116. Patented Dec. 30, 1902.
H. A. PARK.
BAND SAW SHINGLE MACHINE.
(Application filed Sept. 5, 1901.)
(No Model.) 5 Sheets—Sheet 5.
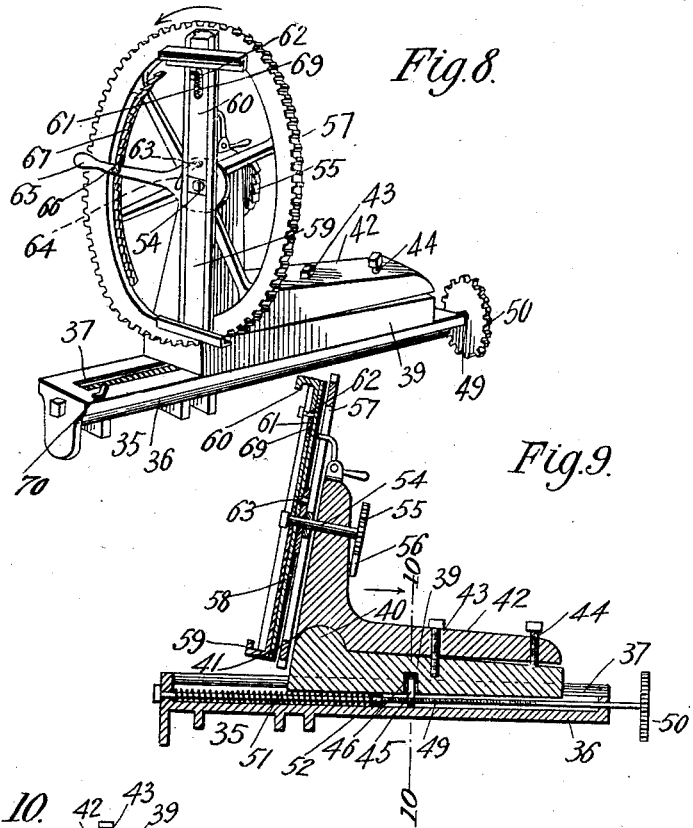
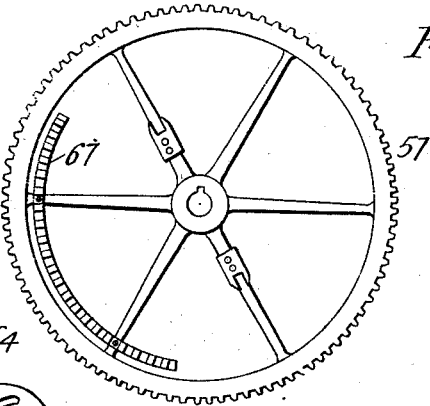
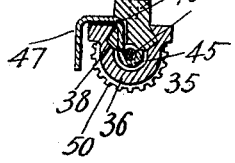
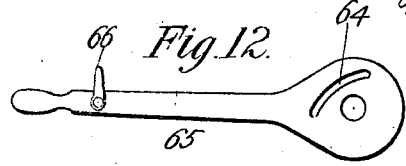
H. A. Park, Inventor
Witnesses:
By Attorneys
THE NORRIS PETERS CO., PHOTO-LITHO., WASHINGTON, D. C.

UNITED STATES PATENT OFFICE.

HENRY A. PARK, OF STACKHOUSE, NORTH CAROLINA.

BAND-SAW SHINGLE-MACHINE.

SPECIFICATION forming part of Letters Patent No. 717,116, dated December 30, 1902.

Application filed September 5, 1901. Serial No. 74,394. (No model.)

*To all whom it may concern:*

Be it known that I, HENRY A. PARK, a citizen of the United States, residing at Stackhouse, in the county of Madison and State of North Carolina, have invented certain new and useful Improvements in Band-Saw Shingle-Machines; and I do declare the following to be a full, clear, and exact description of the invention, such as will enable others skilled in the art to which it appertains to make and use the same.

This invention relates to improvements in band-saw shingle-making machines.

The object of the invention is to provide a machine of this character which shall be comparatively simple of construction and inexpensive of production and also entirely automatic in action upon the placing of the shingle-bolts in position to be carried to and operated upon by the saw to cut the shingles.

With this and other objects in view the invention consists of certain novel features of construction, combination, and arrangement of parts, as will be hereinafter more fully described, and particularly pointed out in the appended claims.

Figure 5:
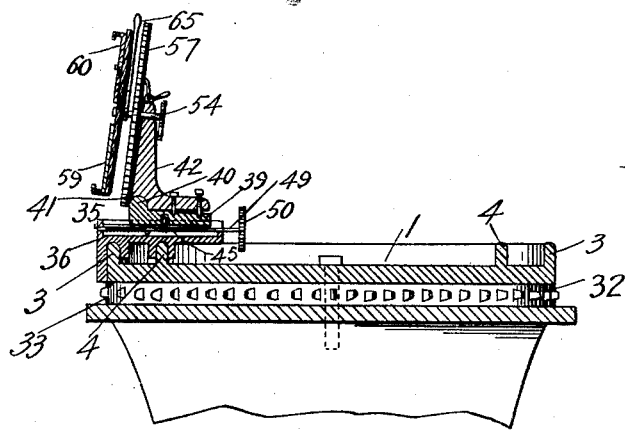
Figure 6:
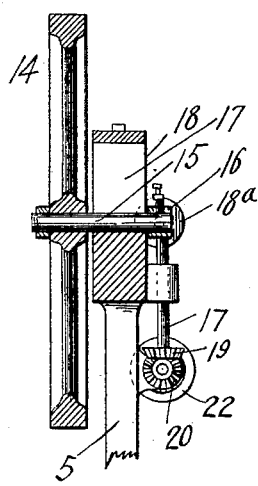
Figure 7:
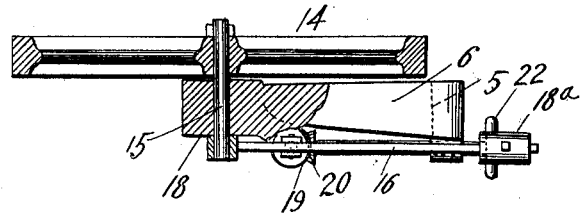
Figure 13:
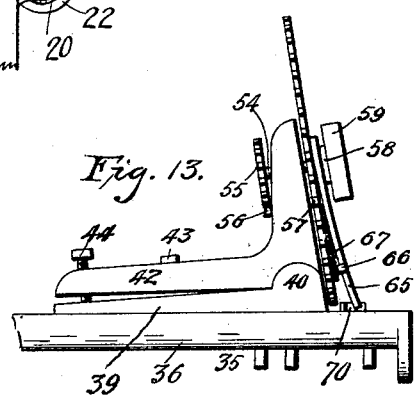
Figure 14:
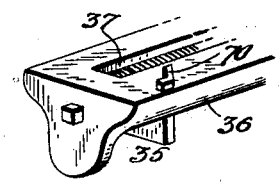

In the accompanying drawings, Figure 1 is a side elevation of a band-saw shingle-machine constructed in accordance with my invention. Fig. 2 is a top-plan view of the same. Figs. 3 and 4 are opposite end elevations. Fig. 5 is a vertical cross-section of the machine on the line 5 5 of Fig. 1. Figs. 6 and 7 are respectively a vertical section and a horizontal section through the bearing of the upper band-wheel of the saw, the tension-lever, and associated parts. Fig. 8 is a perspective view of the head-block or carriage and the parts carried thereby. Fig. 9 is a vertical longitudinal section of the same. Fig. 10 is a transverse section on line 10 10 of Fig. 9. Fig. 11 is a detail front elevation of the gear-wheel for rotating the grippers, and Fig. 12 a similar view of the eccentric lever.

Referring now more particularly to the drawings, the numeral 1 represents the bed or table of the machine, which is supported upon a suitable frame or legs 2. This table is preferably oblong or oval in form and supports a trackway formed by inner and outer track-rails 3 and 4. A standard 5 rises from the frame on one side of the bed or table and is provided at its upper end with an arm 6, which projects transversely across the table at a suitable elevation above the same. This arm is provided at its outer end with a sleeve 7, in which is slidably mounted a stem 8, carrying the upper guide 9 for the vertical working side or stretch 10 of the band-saw 11, the said stem being held in adjusted position by a set-screw 12. A lower guide 13 for the said working side of the saw is also provided and is suitably secured to the contiguous side of the bed or table 1. These guides cause the working stretch of the saw to move in a true vertical path while cutting through the shingle-bolt to form the shingles. The saw is arranged vertically with its working and return stretches on opposites sides of the bed or table 1 and travels in the direction of the arrows, Fig. 4.

The saw passes around and is supported at its upper and lower ends by wheels or pulleys 14 and 14$^a$. The upper pulley 14 is mounted upon a stub-shaft 15, which slides vertically in slot 17, formed in a bearing-block or enlargement 18 on the horizontal arm 6 of the standard 5. This shaft is carried by a tension-lever 16, which is fulcrumed upon a screw-shaft 17', having bearing in a screw-threaded orifice in the said arm 6, and by means of which said lever may be raised and lowered to correspondingly adjust the shaft 15 and increase and decrease the tension on the saw. The lever 16 is provided at its outer end with an adjustable counterweight 18$^a$, which balances the weight of the shaft 15 and the wheel or pulley 14 and at the same time takes up the slack in the saw and maintains a proper tension thereon. The lower end of the screw-shaft 17' carries a bevel-gear 19, which meshes with a corresponding bevel-gear 20 on a shaft 21, journaled in the standard 5, which shaft 21 is provided with a hand-wheel 22, whereby it may be operated to turn the screw-shaft 17' and raise and lower the same as desired. The lower pulley or band-wheel 14$^a$ is rigidly mounted on a horizontal shaft 23, journaled in suitable bearings in or upon the base 2 and carrying a bevel-gear 24, which meshes with a bevel-gear 25 on a vertical shaft 26. The shaft 26 carries at its upper end a friction-wheel 27, which bears against and communicates motion to a friction-wheel 28 on a shaft 29, carrying a sprocket wheel or pinion 30.

Mounted to rotate at the ends of the bed or table 1 are belt-wheels or idlers 31 and 32, around which passes an endless belt or chain 33, provided with sprocket-teeth meshing with the said sprocket wheel or pinion 30, whereby motion is communicated to said sprocket-chain 33. The opposite sides of this chain move in planes parallel with the opposite longitudinal sides of the bed or table 1.

The carriages or head-blocks 35, of which any desired number may be employed, are mounted to traverse the trackway formed by the rails 3 and 4 and are suitably secured to the sprocket-chain 33 to travel therewith. In the present instance I have shown, as sufficient for purpose of illustration, a single head-block or carriage, the same consisting of a semicylindrical or channeled base 36, which extends transversely on the bed or table 1 and is formed or provided with longitudinal dovetailed grooves 37 for the reception of the dovetailed edges 38 of a sliding supporting-plate 39. This plate 39 is provided at its outer end with a rounded rib or projection 40, which enters a corresponding recess 41 in the angle of a tilting knee 42, the said projection 40 serving as a fulcrum on which the knee is adapted to tilt or oscillate. The lower or horizontal arm of the knee 42 is loosely connected by a bolt or screw 43 to the sliding plate 39, so that it may have a limited tilting movement, and carries a set-screw 44, which impinges against said plate 39 and by means of which the knee may be adjusted to tilt on the fulcrum 40 to the degree afforded by the screw 43, which acts in the nature of a stop. The sliding supporting-plate 39 has pivoted thereto a half-nut 45, the pivotal connection being indicated at 46, the said nut being arranged to tilt or oscillate in a vertical plane in the chamber or cavity of the semicylindrical base 36. The said nut 45 has an angular arm 47, which projects outwardly and downwardly upon the rear side of the carriage or head-block and is adapted to be operated for the purpose and in the manner hereinafter described. The said nut 45 is normally elevated and in engagement with a feed-screw 49, journaled in said base 36, which screw carries at its inner end a pinion 50. The outer end of the screw is surrounded by a coiled retracting-spring 51, which bears at one end against the wall of the base 36 and at the other end against a lug 52, through which the feed-screw passes and which hangs pendent from the sliding supporting-plate 39. On the bed or table 1 is arranged a rack-bar 53, which lies in the path of travel of the pinion 50 and rotates the same, so as to communicate motion to the feed-screw 49 to slide the supporting-plate outward to feed the shingle-bolt to the saw, motion being communicated from the screw to the said sliding supporting-plate through the instrumentality of the half-nut 45, carried by said plate. When all the available shingles have been cut off a block and the spalt has been released and a new block substituted, the arm 47 of the nut 45 is elevated by the attendant, thereby throwing the half-nut 45 downward and out of engagement with the feed-screw 49, leaving the sliding supporting-plate 39 free to be forced backward or retracted by the spring 51, thus setting the bolt-holder, so that when the carriage moves by the working stretch of the saw the latter may make the first cut on the new bolt.

Journaled in the upper end of the vertical arm of the knee 42 is a shaft 54, to one end of which is rigidly attached a ratchet-wheel 55, which is engaged by a pawl 56, suitably mounted upon said knee. To the other or outer end of said shaft 54 is keyed or otherwise rigidly secured a spur gear-wheel 57 and in advance of the same a supporting plate or bar 58, carrying grippers 59 and 60. The gripper 59 is preferably fixed to the plate, while the gripper 60 is longitudinally adjustable thereon, being arranged to slide toward and from the gripper 59 in a dovetailed groove in said plate. Each of these grippers consists of a plate or bar provided at its outer end with a clamping lug or spur to engage the shingle-bolt, and the gripper 60 is formed with a longitudinal slot 61 for the reception of a limitation-pin 62 on the said supporting-plate 58. The gripper 60 is adjusted toward and from the gripper 59 through the medium of a pin 63 thereon, which fits and slides within an eccentric slot 64 in an adjusting-lever 65, loosely mounted on shaft 54 between the said supporting-plate 58 and the gear-wheel 57. This lever 65 carries a pawl 66 to engage a ratchet-segment 67, secured to the outer face of the wheel 57, whereby said lever may be locked to hold the gripper 60 in its adjusted position to clamp the shingle-bolt between it and the gripper 59. The supporting-plate 58 and the grippers 59 and 60, carried thereby, are arranged at an angle to the perpendicular, so as to hold the shingle-bolt in an inclined position relative to the working stretch 10 of the band-saw 11, so that by reversing the shingle-bolt the saw will cut at an angle thereto and form the inclined sides of a shingle tapered to the desired extent. In other words, the gripping mechanism lies at an oblique angle to the path of travel of the cutting portion of the saw, with the lower gripping device closer to the saw, so that the saw cuts vertically through the bolt and by the reversal of the bolt after one side of the shingle has been cut forms the other side at an angle thereto, giving the correct taper to the shingle. By means of the said screw 44 the knee 42 may be tilted to vary the angle of inclination of the gripping mechanism to increase or decrease the degree of inclination of the sides of the completed shingle, as desired. As before stated, after one side of the shingle has been cut by the saw the bolt is automatically reversed to complete the cutting of the shingle and to give the correct taper thereto by turning the shaft 54 one-half revolution to reverse the position of the gripping devices, this operation being accomplished while the head-block or carrier is traveling along the trackway at or near the return or inactive stretch of the saw by a toothed rack 68, meshing with and imparting motion to the gear-wheel 57, and consequently to the shaft 54 and the gripping mechanism carried thereby. The sliding gripping member 60 is adapted to be projected by a protracting-spring 69 and is held closed against the tension of said spring and in engagement with the shingle-bolt by the clamping action of the eccentric lever 65. After the bolt has been cut away to the maximum extent and the spalt or piece left engaged by the grippers cannot be utilized in the formation of another shingle such spalt is automatically released from the grippers by an inclined trip-lug 70, formed or provided upon the head-block 36, which lug engages the outwardly-projecting arm of the eccentric lever 65 and the pawl attached thereto, releasing said lever from the rack 67, so that the spring 69 will automatically project the sliding gripper 60 and release the spalt or waste portion of the bolt, allowing the latter to drop down upon the bed or table or to discharge at the side of the machine onto the floor or into any suitable receptacle. This operation is effected in the following manner: The gear-wheel 57 is given a half-rotation by the rack 68. When said gear-wheel engages the rack, it (the gear-wheel) turns in the direction of the arrow shown in Fig. 8, and when it has made a little more than a quarter-revolution the outer end of the arm of the lever 65 is brought into contact with the inclined face of the lug 70, which gradually bends the said arm of the lever outward from the front face of the gear-wheel, as shown, until the pawl 66 is withdrawn from engagement with the rack 67 and the lever-arm engages the stop-shoulder at the end of the lug. At this time the lever will be freed from engagement with the gear-wheel 57 by the disengagement of the pawl 66 from the rack 67 and will be held from further movement in the direction of movement of the gear-wheel by the shoulder at the end of the inclined lug 70. The gear-wheel 57 has not yet, however, completed its movement, and as it continues to turn the pin 64 upon the movable gripper 60 (which turns with the gear-wheel) travels from the inner to the outer end of the cam-slot 64 in the lever, thus allowing the gripper 60 to be projected under the combined action of one of the walls of said slot 64 and the protracting-spring 69, thus releasing the spalt, which is allowed to drop out from between the grippers or is removed by hand. At the time the gripper 60 is fully projected the gear-wheel 57 has completed its movement, and then an attendant releases the lever 65 from engagement with the lug 70, inserts a new shingle bolt or block between the two grippers 59 and 60, and returns the lever to its normal position to slide the gripper 60 inward to clamp the bolt and to lock the lever to the gear-wheel by the engagement of the pawl 66 with the rack 67. The continued movement of the carriage next brings the arm 47 of the nut 45 into engagement with the trip device 48, whereupon the supporting-plate 39 is retracted by the spring 51, thus resetting the parts for sawing shingles from the new bolt. The operation of cutting the shingles then proceeds as before. The shaft 23 is provided with a belt-pulley 71 to receive motion from any suitable source of power.

In operation as the drive-shaft revolves motion is transmitted to the endless sprocket-chain and band-saw, which latter travels in the direction of the arrows shown in Fig. 4, while the head-blocks or carriages (of which any desired number may be employed) travel around the trackway formed by the inner and outer track-rails 3 and 4 in the direction of the arrow shown in Fig. 2. After each head-block or carriage has passed beyond the standard 5 and the shingle-bolt is inserted between the grippers thereof and the eccentric lever adjusted to throw the sliding gripping member into engagement with the bolt to tightly clamp the same. As the carriage reaches and travels along that portion of the trackway leading to the working stretch 10 of the saw the bolt is automatically fed up by the pinion 50, engaging the rack 53, which causes the rotation of the screw-shaft attached thereto, which by engaging the half-nut 45 slides the supporting-plate 39 and the gripping mechanism attached thereto outwardly, thereby bringing the outer portion of the bolt into position to be cut by the saw. After the outer side or face of the bolt has been properly trimmed off to form in this manner one side of the shingle the head-block or carriage moves on, and when the spur-gear 57 meshes with the rack 68 the shaft 54 is given a half-revolution, thereby reversing the position of the grippers and the shingle-block carried thereby, so that when the block is brought into position the saw will cut at the proper angle thereto and cut off the shingle. This operation is repeated until all of the available portion of the bolt is used in the production of the shingles, and when the grippers have been fed up to this point the outer arm of the eccentric lever 65 comes into engagement with the lug 70, whereby said lever is released from engagement with the rack 67, leaving the sliding gripper 60 free to be projected by its retracting-spring and to release the spalt or remaining waste portion of the bolt. The new bolt is then inserted between the grippers by the attendant, who thereupon operates the arm 47 of the half-nut 45 to release said nut from engagement with the screw-shaft 49, so as to allow the spring 51 to force the sliding supporting-plate 39 back to its original position ready to begin the operation of cutting shingles from the new bolt.

From the foregoing description, taken in connection with the accompanying drawings, the construction, mode of operation, and advantages of the invention will be readily understood, and it will be seen that a simple and effective automatic machine is provided.

Changes in the formation, operation, and minor details of construction may be made within the scope of the invention without departing from the spirit or sacrificing any of the advantages thereof.

Having thus described my invention, what I desire to secure by Letters Patent is—

1. In a shingle-making machine, the combination with a supporting-frame, and a band-saw, of grippers arranged at an angle to the path of travel of the saw, and adapted to hold the shingle-bolt, means for moving the grippers toward the saw to feed the bolt thereto, means for varying the position of the grippers to reverse the bolt end for end, and means for automatically throwing the grippers out of operation to release the spalt, substantially as described.

2. In a shingle-machine, and in combination with a suitable frame and saw, a bolt-holder normally inclined with relation to the path of travel of the saw, means for producing a relative motion of the saw and bolt-holder past each other, means for varying the angle of inclination of the bolt-holder, and means for operating the bolt-holder to reverse the shingle end for end, substantially as described.

3. In a band-saw shingle-machine, the combination with a supporting-frame having a trackway, of a band-saw, a carriage traversing said trackway, gripping devices mounted on said carriage and arranged at an angle of inclination to the working portion of the saw, means for automatically reversing the position of the grippers to reverse the shingle-bolt carried thereby end for end, means for automatically moving the grippers toward the saw to feed the bolt thereto, means for automatically throwing the grippers out of operation to release the spalt or waste portion of the bolt, and means for automatically retracting the grippers and restoring them to their normal position, substantially as described.

4. In a band-saw shingle-machine, the combination with a band-saw, of a bolt-holder inclined with relation to the saw, means for producing a relative motion of the saw and bolt-holder past each other, and means for rotating said holder to reverse the position of the bolt, substantially as described.

5. In a shingle-machine and in combination with a suitable supporting-frame and a band-saw, a rotary bolt-holder provided with grippers and standing at an inclination to the path of travel of the working portion of the saw, means for moving the holder past the saw, and means for rotating said holder to reverse the position of the bolt, substantially as described.

6. In a shingle-machine, and in combination with a suitable supporting-frame and a band-saw, a traveling carriage, a gear-wheel mounted on said carriage, grippers carried by said gear-wheel and arranged at an angle to the working portion of the saw, and means for turning the said gear-wheel to reverse the position of the grippers and bolt, substantially as described.

7. In a shingle-machine, a supporting-frame, a band-saw, a traveling carriage, grippers carried by said carriage and arranged at an angle of inclination to said saw, means for adjusting the angle of inclination of said grippers, and means for varying the position of the grippers to reverse the same and the bolt carried thereby, substantially as described.

8. In a shingle-machine, and in combination with a supporting-frame, and a band-saw, a traveling carriage, a sliding supporting-plate, rotary gripping means carried by said supporting-plate and arranged at an angle to the saw, means for automatically projecting the supporting-plate to feed the bolt to the saw, means for varying the angle of inclination of the grippers to the saw, means for moving the grippers to reverse the bolt carried thereby, and means for automatically releasing the grippers, substantially as described.

9. In a shingle-machine, the combination of a supporting-frame, a band-saw, a traveling carrier, a head-block mounted on said carrier, a knee slidably and pivotally mounted upon said head-block, grippers carried by the knee, means for adjusting the knee to hold the grippers at a desired inclination to the saw, means for sliding the knee to feed the bolt to the saw, means for retracting the knee, and means for automatically throwing the grippers out of engagement to release the waste portion of the bolt, substantially as described.

10. In a shingle-machine, and in combination with a supporting-frame and band-saw, a traveling carrier, a head-block attached to said carrier, a supporting-plate slidably mounted on said block, a knee mounted to tilt upon the plate, a gear-wheel mounted upon the knee and carrying grippers, means for adjusting the knee to change the angular position of the grippers, means for actuating the grippers to clamp the shingle-bolt, a feed-screw provided with a pinion, a rack on the base to engage said pinion to operate said screw, a nut carried by the supporting-plate and engaging said screw, means whereby the nut may be thrown out of engagement with the screw, means for releasing the waste portion of the bolt from the grippers, and a rack on the frame adapted to mesh with said gear-wheel to reverse the position of the grippers and shingle-bolt, substantially as described.

11. In a shingle-machine, and in combination with a suitable frame and saw, a bolt-holder normally inclined with relation to the path of travel of the saw, means for producing a relative motion of the saw and bolt-holder past each other, and means for operating the bolt-holder to reverse the shingle end for end, substantially in the manner set forth.

In testimony whereof I have hereunto set my hand in presence of two subscribing witnesses.

HENRY A. PARK.

Witnesses:
J. R. GOOD,
M. M. McFALL.